United States Patent Office 3,189,166
Patented June 15, 1965

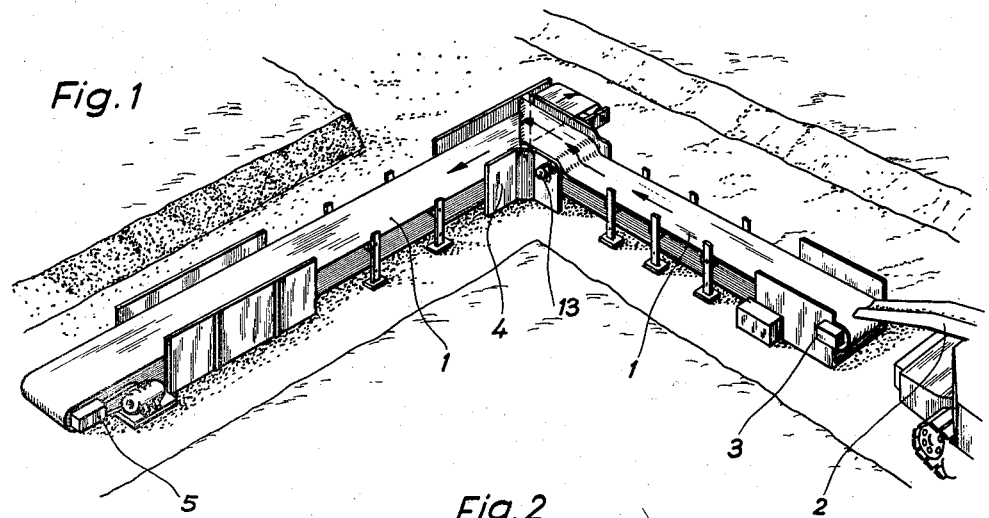
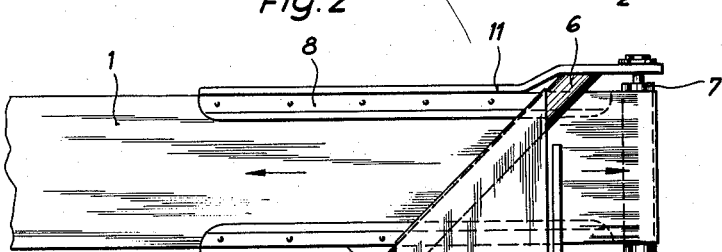
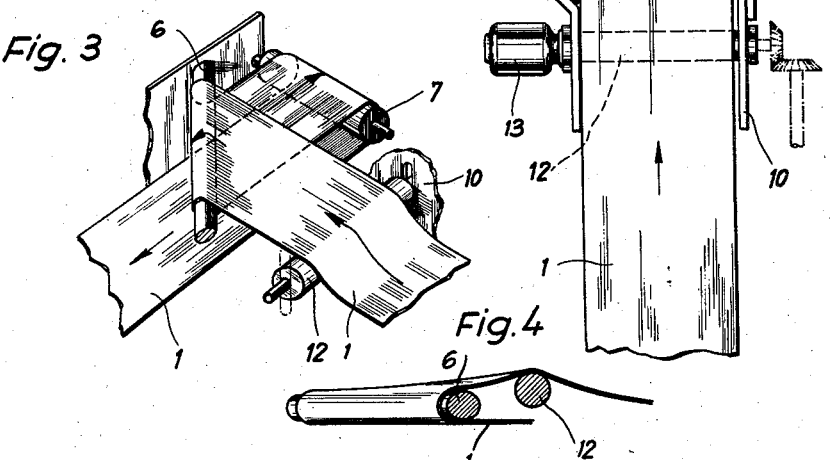
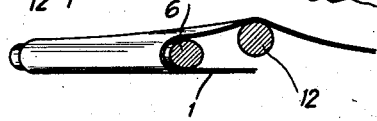

3,189,166
BELT CONVEYOR
Hans Ziller, Kirschenallee 3, Millrath uber
Hochdahl, Germany
Filed Feb. 8, 1961, Ser. No. 87,801
Claims priority, application Germany, Feb. 11, 1960,
Z 7,809/60
6 Claims. (Cl. 198—187)

The present invention relates to a belt conveyor, and more particularly, to a belt conveyor with an angle station, especially for use in connection with mining operations.

When employing continuously operating loading machines for cut coal in mining operations of coal, the customary conveying means, especially for loading and conveying the cut coal, are subjected to considerable stresses. The uninterrupted mining operation which as far as possible is not to be interrupted by stopping the belt conveyor for rearranging the same, or for other reasons, is frequently carried out by so-called extensible belt conveyors. Conveyors of this type consist primarily of a driving station in which a belt for approximately 30 yards is stored and of a reversing station which customarily is provided with devices for receiving the delivery flow of the continuously working loading machine for the cut coal. When advancing the chambers and the working sections in mining, it is also known to arrange such extensible belt conveyor not only along a straight line in the feeding direction but also by interposing a driveless angle station to obtain any desired change in the direction up to 90° by a single conveyor belt.

Such angle stations consist primarily of a frame with deviating rollers and lateral covers for the material to be conveyed. Moreover, the frame is provided with lateral guiding means, for instance lateral sheet metal parts or the like for guiding the belt.

At such an angle station, naturally the wear of the conveyor belt, especially the stress within the required hook connection is unduly high because the deviation of the belt is effected not by drums of a fairly large diameter as is the case at the belt drive, but by means of small diameter, for instance corresponding to the diameter of the ordinary conveyor rollers. The above conditions apply in particular to the deviating beam which is inclined with regard to the direction of movement and which has to be mounted as stationary beam in order to prevent a shimmying and/or lateral beating of the belt. On the other hand, such angle station has great advantages because simultaneously with the change in direction, a further transmitting or loading device, and in particular an additional belt drive with reversing station will be saved. It has also been suggested to reduce the friction occurring on the deviating beam by providing balls in the surface of the beam. However, with such an arrangement, a kind of point contact is established with the conveyor belt which point contact has a disadvantageous effect upon the belt insert and the conver material. Also the shimmying of the conveyor belt cannot be entirely avoided by such an arrangement.

It is, therefore, an object of the present invention to provide an angle station which will overcome the above mentioned drawbacks.

It is another object of this invention to provide an angle station for use in connection with a continuous coal conveying during mining operations, in which means are associated with the deviating beam at the angle station which will considerably reduce the wear within the range of said beam.

These and other objects and advantages of the invention will appear more clearly from the following specification in connection with the accompanying drawing, in which:

FIG. 1 is a perspective view of a belt conveyor angle station according to the present invention, FIG. 2 illustrates on a larger scale than FIG. 1 the very corner of the angle station, FIGURE 3 is a perspective view showing the auxiliary driving roller adjacent the deviating beam and illustrating vertical adjustability thereof; and FIGURE 4 is a sectional view showing the auxiliary driving roller located somewhat higher than the deviating beam.

General arrangement

The present invention is characterized primarily in that with a conveyor system comprising a belt conveyor and an angle station, one or a plurality of driving rollers are provided at the angle station within the range of the deviating beam, while the speed of rotation of said driving roller or rollers is so dimensioned that the driving roller or rollers acting upon the belt directly ahead of the deviating beam will run at a higher surface speed than the average speed of the belt. The driving roller or rollers will thus be given the task to see to it that the conveyor belt which runs at a certain average belt speed will directly ahead of the inclined deviating beam be urged in feeding direction in order thereby to reduce the friction acting upon the deviating beam. The particularly high friction and bend caused at said deviating beam by the change in direction of the movement of the belt, which friction and bend particularly harmfully affect the life of the belt in view of the belt tension, will be considerably reduced by the above arrangement of one or more driving rollers. The provision of a driving roller ahead of the deviating beam, when looking in driving direction, also greatly relieves the guiding of the belt around the deviating beam inasmuch as the belt is so to speak pushed over the deviating beam.

Depending on the arrangement of the conveyor system, the driving roller according to the present invention may be driven by the driving or reversing station or by the deviating roller of the angle station, for instance through the intervention of a bevel gear transmission. In the last mentioned instance, the required increase in the speed may be mechanically effected in a simple manner. If, however, the driving roller is to be driven by a drive of its own, it is necessary to bring the drive for the driving rollers into tune with the drive of the extensible belt conveyor in order always to assure the necessary high speed.

It is furthermore advantageous to effect the drive of the driving roller so that it may be varied within certain limits in order to permit that the drive for the driving roller may either automatically or manually be varied in conformity with the charged quantity on the belt and the actual belt speed.

It is also advantageous to arrange the driving roller higher than the remaining supporting rollers of the belt conveyor, and in particular higher than the deviating beam. The height of the driving roller may, if desired, be made adjustable so that the effect of the driving roller may be varied from case to case.

However, it is to be understood that the essence of the invention is not affected by the last mentioned features but consists in that the driving roller pushes the conveyor belt in the direction toward the deviating beam and that this push effectively reduces the stress of the belt at said deviating beam.

Structural Arrangement

Referring now to the drawing in detail, FIG. 1 shows an angle station with an extensible conveyor belt 1 which is loaded for instance with coal by a bridge conveyor 2.

At the discharge end of the bridge conveyor there is located the reversing station 3 of the belt.

As will be seen from the drawing, an angle station 4 is interposed in the conveyor system, at which angle station the belt 1 is adapted to be angled by an angle up to 90°. The other end of belt 1 has associated therewith the driving station 5 and the magazine for the extensible belt 1.

The angle station 4 comprising a frame is equipped with a deviating beam 6 (FIG. 2) which is arranged at an angle with regard to the conveying direction of the first portion of belt 1, i.e. to that portion of belt 1 which is located on the right-hand side of FIG. 1. By means of said inclined deviating beam 6, the belt is conveyed to a deviating roller 7 and from there to a driving station 5. The said angle station is equipped with lateral cover members 8 for the goods being conveyed and is furthermore equipped with guiding members 9, 10 and 11 for belt 1.

In conformity with the present invention, ahead of the deviating beam 6 there are provided one or more driving rollers 12 which are driven individually or in groups, for instance by an electric motor 13. Instead of driving the driving roller 12 by said motor 13, the driving rollers may also be driven by the driving or reversing station 3 or 5, or by the deviating roller 7 through the intervention of mechanical transmission as for instance a bevel gear transmission or the like. Advantageously, the motor or mechanical drive for the driving roller 12 is variable. It is important that the speed of the driving roller be so adjusted that the belt section being fed to the deviating beam 6 by the driving roller will be pushed thereby toward the deviating roller. The surface speed of roller 12 is thus a somewhat higher speed than the average speed of belt 1.

It is, of course, to be understood that the present invention, is by no means, limited to the particular construction shown in the drawing but also comprises any modifications within the scope of the appended claims.

While the ratio of the circumferential speed of the driving roller 12 to the driving speed of the belt 1 may be selected and varied in conformity with the respective situation, i.e. the goods to be conveyed, the angular position of the deviating beam and other factors, it may be mentioned purely by way of example that with an arrangement of the deviating beam as shown in the drawing and a belt speed of two meter per second, the circumferential speed for the driving roller 12 may be selected as two and a half meters per second. Usually the circumferential speed of the driving roller 12 will be from about 15 to 25 percent higher than the belt speed.

FIG. 3 is a perspective view of the very corner of the angle station to show the position of the deviating beam 6, the deviating roller 7 and the driving roller 12. This driving roller 12 is located at a level higher than said deviating beam, as can be seen best in FIG. 4. Preferably the driving roller means is adjustable as to height (FIG. 3). So it will always be able to effect good engagement with the belt 1 so as to push the belt toward the following deviating roller.

What I claim is:

1. In a belt conveying system having a conveyor belt, driving means for driving said belt at its normal driving speed, and an angle station with a deviating beam forming an angle with the direction of movement of the belt to said deviating beam for deviating said belt into another direction, which includes driving roller means arranged adjacent to and preceding said deviating beam when looking in the direction of movement of said belt and frictionally engaging said belt, and means drivingly connected to said driving roller means and operable to drive said driving roller means at a higher surface speed than the normal driving speed of said belt while the latter is being driven at its normal driving speed thereby to urge the belt toward said deviating beam and reduce the friction between the belt and the beam, said driving roller means being located beneath the belt and engaging the underside of the belt.

2. In a belt conveying system having a conveyor belt, driving means for driving said belt at its normal driving speed, and an angle station with a deviating beam forming an angle with the direction of movement of the belt to said deviating beam for deviating said belt into another direction, which includes driving roller means beneath the belt arranged adjacent to and preceding said deviating beam when looking in the direction of movement of said belt and frictionally engaging said belt, and transmission means drivingly interconnecting said driving roller means with said driving mean, said transmission means being operable to drive said driving roller means at a higher surface speed than the speed at which said driving means drives said belt thereby to urge the belt toward said deviating beam and reduce the frictional engagement of the belt with the beam.

3. A belt conveying system according to claim 2, in which said transmission means comprises a bevel gear transmission.

4. In a belt conveying system having a conveyor belt, driving means for driving said belt at its normal driving speed, and an angle station with a deviating beam forming an angle with the direction of movement of the belt to said deviating beam for deviating said belt into another direction, which includes driving roller means beneath the belt arranged adjacent to and preceding said deviating beam and frictionally engaging said belt, and additional driving means independent of said first mentioned driving means and drivingly connected to said driving roller means, said additional driving means being operable to drive said driving roller means at a higher surface speed than the normal driving speed of said first mentioned driving means for urging said belt toward said deviating beam to thereby reduce the friction between the belt and the beam.

5. A belt conveying system according to claim 1, in which said driving roller means is located at a level higher than said deviating beam.

6. A belt conveying system according to claim 1, in which said driving roller means is adjustable to height.

References Cited by the Examiner

UNITED STATES PATENTS 1,410,667  3/22  Ford.
2,222,019  11/40  Buchanan _____ 198—187 X
2,950,809  8/60  Sinden _____ 198—202

FOREIGN PATENTS 491,860  2/30  Germany.

SAMUEL F. COLEMAN, *Primary Examiner.*

JULIUS E. WEST, WILLIAM B. LA BORDE,
*Examiners.*